United States Patent [11] 3,525,298

[72] Inventor Norbert Nicolaus
    Elze, Germany
[21] Appl. No. 763,878
[22] Filed Sept. 30, 1968
[45] Patented Aug. 25, 1970
[73] Assignee Homann-Maytag GmbH
    Sarstedt, Germany
    a joint stock company of Germany
[32] Priority May 18, 1968
[33] Germany
[31] No. P1,778,637.7

[54] COOKING EQUIPMENT
    11 Claims, 1 Drawing Fig.
[52] U.S. Cl. .................................................. 99/334,
                                                    99/355
[51] Int. Cl. .............................................. A47j 37/00
[50] Field of Search ...................................... 99/334,
                                               335, 324, 325, 1

[56] References Cited
UNITED STATES PATENTS
3,056,877  10/1962  Schmidt et al. ............... 99/1UX
3,071,473  1/1963   Churley ......................... 99/1X
3,347,152  10/1967  Congelli et al ................. 99/334

Primary Examiner— Billy J. Wilhite
Attorney—Mason, Mason and Albright

ABSTRACT: Cooking equipment includes a plurality of chambers having entry and exit doors, a supply conveyor to lead containers with food to be treated therein and a delivery conveyor to remove containers with treated food from the chambers. A control system is effective to control the chambers according to the contents of individual containers, and the system includes a control panel at the upstream end of the supply conveyor.

Patented Aug. 25, 1970 3,525,298
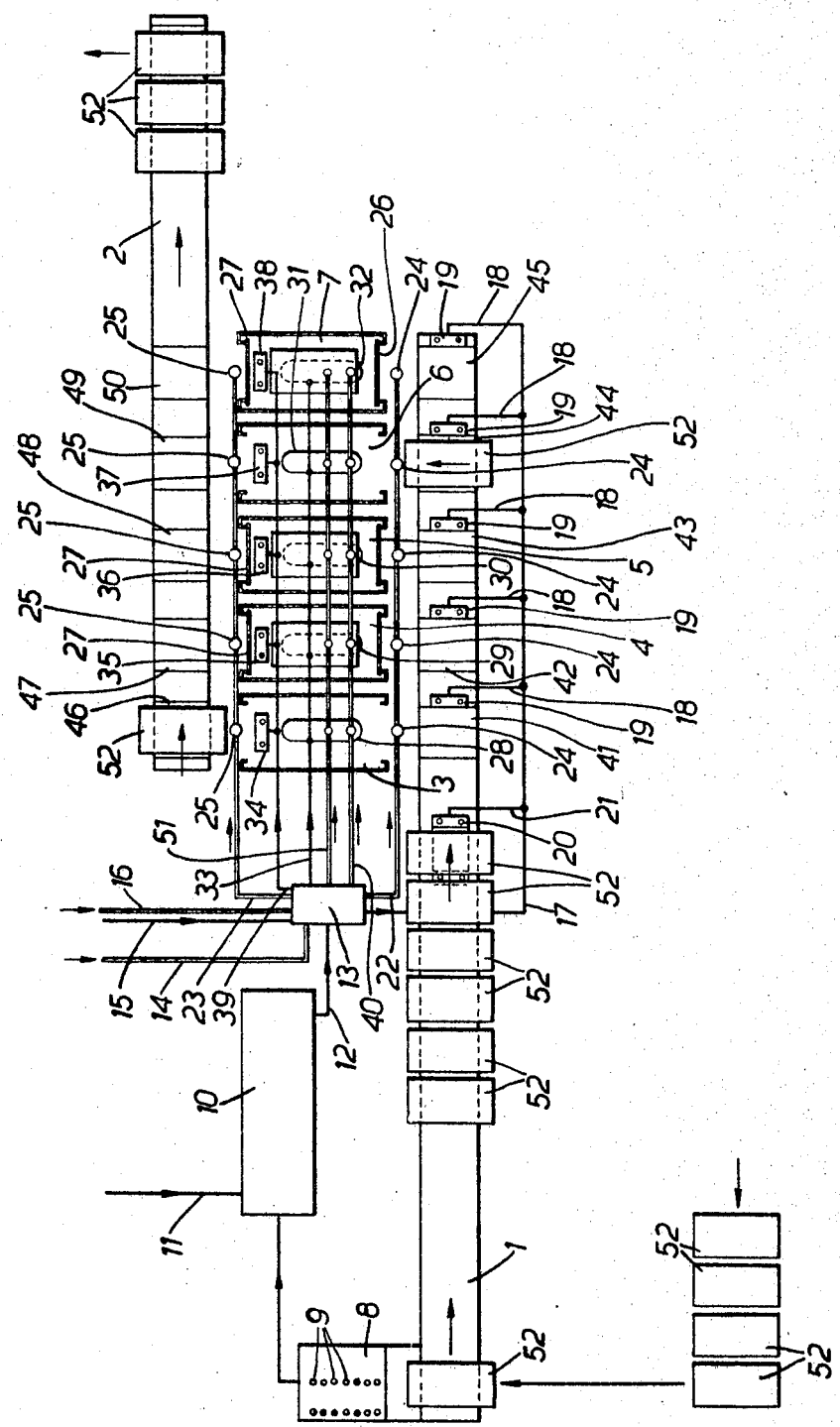
INVENTOR
NORBERT NICOLAUS
BY
Mason, Mason & Albright
ATTORNEY

COOKING EQUIPMENT

BACKGROUND OF THE INVENTION

1. Field of the Invention

This invention relates to equipment for the boiling, simmering, roasting, thawing-out and the like of foodstuffs in containers.

2. Description of the Prior Art

Equipment has been proposed in which various foodstuffs can be continuously simmered and boiled. These include, for example, installations in which, with the aid of basket-like charging containers, the goods to be cooked are conveyed into a chamber filled with steam at or slightly above atmospheric pressure and leave this chamber ready-cooked after a given time. The disadvantages of such an installation are the necessity of portioning-out the goods at the equipment itself, the ancillary equipment needed for this purpose and the long periods required for cooking at or only slightly above atmospheric pressure, as well as the loss of vitamins and nutritional value due to the long cooking times, in addition to the need, at the exit from the machine, for transferring to other containers, boilers etc. the cooked foodstuffs, which are sometimes very soft and require gentle handling.

There has also been proposed a cooking device in which some of these drawbacks are overcome by an arrangement whereby the cooking is carried out under pressure and the foods are portioned-out beforehand into large containers, which then pass through this automatic cooking machine. An installation of this kind, again, is subject to the disadvantage that different foods require different cooking times and pressures for proper cooking. Such equipment can accordingly be used only where one single class of food is to be dealt with, unless considerable loss of time can be tolerated.

Present-day techniques require, however, flexibility as regards the foods cooked and the cooking processes used, the employment of the minimum of manual labour and a high degree of certainty in the effectiveness of the processes carried out.

SUMMARY OF THE INVENTION

According to the present invention there is provided in cooking equipment in which food is cooked in containers a plurality of cooking chambers, a supply conveyor to lead the containers to the chambers, a further conveyor to lead the containers from the chambers, the improvement comprising pre-selector means, a control panel connected to the pre-selector means that can be set according to the contents of the containers deposited in succession on the supply conveyor, and by the fact that the programme laid down for this passes the appropriate data either to an information store or directly to the chamber controls and thus applies the cooking time, temperature, steam pressure and other factors to the particular filled containers concerned, as they arrive in any desired order.

Where an installation of this description is equipped with devices for opening and closing the doors of each pressure chamber, these opening and closing devices are likewise operated in accordance with the information stored.

According to another feature of the invention, the barriers fitted to the conveyor are also operated in accordance with the stored information.

A barrier should preferably be allotted to each pressure chamber, to halt the transport containers opposite the appropriate pressure chambers.

The conveyor should preferably be provided with a further barrier, the containers on the conveyor being allowed to approach only to a predetermined position. Should several containers have reached this waiting station, then, when a pressure chamber becomes free, the barrier opens to allow only the leading container to pass.

According to a further feature of the invention, every pressure chamber is provided with charging and discharging mechanisms operated in accordance with the stored information.

The invention thus provides a food treatment line with pre-selection facilities, which can readily be equipped with electronic or any other controls. The invention makes it possible to dispense with transferring the food from one receptacle to another. Moreover, the entire process of preparing, treating and distributing the food is programmed, thus ensuring shorter processing and waiting times.

BRIEF DESCRIPTION OF THE DRAWING

An embodiment of cooking equipment in accordance with the invention will now be described, by way of example, with reference to the accompanying diagrammatic drawing the sole figure of which shows a plan of the equipment.

DESCRIPTION OF THE PREFERRED EMBODIMENT

Referring now to the drawing, the equipment includes a supply conveyor 1, such as a roller conveyor with inclined roller track and a further conveyor 2 at the delivery end. Between these two conveyors 1 and 2 there are provided pressure chambers 3 to 7, in which a particular treatment, such as simmering, roasting, thawing-out and the like, is carried out. More or less than five pressure chambers can be employed and they can be turned through 90° relative to the illustrated position. Another possibility is to fit two or more pressure chambers behind one another in series, that is to say in alignment with one another.

At the starting end of the conveyor 1 is a control panel 8 with pre-selectors 9. This control panel 8 is connected to an information store 10, which receives an electric power supply via a line 11. This information store 10 is connected by a line 12 to a switching unit, 13, and to this a compressed-air supply is joined by a pipe 14, a source of current through a line 15 and a steam generator through a pipe 16.

This switching unit 13 is connected over the lines 17 and 18 to barrier 19, fitted to the supply conveyor 1, each barrier 19 being associated with a particular one of the pressure chambers 3 to 7. A further barrier 20, is connected by a line 21 to the line 17.

The switching unit 13 is also connected to compressed-air pipes 22 and 23, which in turn serve opening and closing mechanisms, such as ram cylinders 24 and 25, for operating pressure-chamber doors 26 and 27. Electric heaters 28—32 provide for roasting and are connected to the supply line 15 via a line 33 and the switching unit 13.

All the pressure chambers 3 to 7 are provided at their exits with barriers 34 to 38, connected to the switching unit 13 by a conductor 39.

The various pressure chambers 3 to 7 are also connected to the switching unit 13 by a steam pipe 40.

In addition, each of the pressure chambers 3 to 7 is equipped with one of the charging mechanisms 41 to 45 and one of the discharging mechanisms 36 to 50. Any condensate produced by boiling or other processes in the pressure chambers 3 to 7 is carried away by a pipe 51.

The mode of operation of the installation is as follows:

At the preparing point, the various raw foods are placed in containers 52, which are deposited one after another on the supply conveyor 1. The filled containers 52 having been placed on the conveyor 1, the appropriate pre-selector is operated. When, for example, a container filled with raw potatoes is put on to the conveyor 1, the pre-selector setting for "potatoes, 30 minutes" is made. Other pre-selectors are operated as appropriate when, for instance, peas, beans or meat are required to be simmered, boiled or roasted for periods of one hour and so forth. The data thus passed to the control panel are put into the information store 10, which, on the basis of this information, allots to each of the pressure chambers 3 to 7 whichever of the containers 52 is appropriate, according to the nature of the food and the cooking time.

As the conveyor 1 is inclined, the containers 52 move down until held up by the barrier 20.

As soon as one of the pressure chambers 3 to 7, for example 3, becomes free and advises the information store 10 accordingly by a release signal, the barrier 20 is opened to enable the container 52 behind it to move on to the barrier 19 shown on the left in the drawing, which halts this container 52. Thereupon, the appropriate charging mechanism 41 is operated and moves the container 52 into the pressure chamber 3. The information store 10 then ensures that power is conveyed through the pipes 22 and 23 to the opening and closing mechanisms 24 and 25, that is to say the ram cylinders or the like, so that the pressure-chamber doors 26 and 27 are closed. By virtue of the data fed into the information store 10, the pre-determined cooking time and steam pressure are precisely observed. On completion of the treatment (the boiling of the potatoes, in the example chosen), the doors 27 and 27 of the pressure chamber 3 are opened and the barrier 34 is opened, the discharge mechanism 46 coming into action and depositing the container on the conveyor 2. The discharge mechanism may be omitted and the containers are then removed by hand. The conveyor 2 then takes the food in the container, ready for eating, to a distributing station or the like.

It is essential to be able to apply different pressures and processing times to each charge at will. Obviously, to prevent overlaps in the charging and discharging of the pressure-chambers, time barriers need to be incorporated in the control system.

I claim:
1. In cooking equipment in which food is cooked in containers:
   a plurality of cooking chambers each having entry and exit closure means;
   a supply conveyor to lead the containers to the cooking chambers;
   a delivery conveyor to lead the containers from the chambers;
   the improvement comprising, pre-selector means that can be set according to the contents of the containers deposited in succession on the supply conveyor;
   control panel means connected to operate the pre-selector means; and
   chamber control means;
   the programme fed through the control panel to the pre-selector means being operative on the chamber control means whereby the correct cooking time, temperature, steam pressure and other factors are set in the cooking chambers in dependence upon the contents of the containers supplied to selected said chambers.

2. Equipment according to claim 1, wherein the control panel means is disposed at the feed end of the supply conveyor.

3. Equipment according to claim 1 further comprising information store means:
   said store means being operatively interposed between said pre-selector means and the chamber control means.

4. Equipment according to claim 3, wherein said chamber control means includes:
   control mechanisms for the entry and exit closure means of each said cooking chamber; and
   the operation of the control means being governed by data fed into and received from the said information store means.

5. Equipment according to claim 3, further comprising:
   barriers fitted to the supply conveyor; and
   the operation of said barriers being controlled by the data fed into and received from the information store means.

6. Equipment according to claim 5 wherein one said barrier is arranged to cooperate with one said cooking chamber and is arranged to halt a container destined for said cooking chamber once the container is aligned for insertion through the entry closure means into the cooking chamber.

7. Equipment according to claim 5 further comprising an additional barrier on the supply conveyor to limit the movement of the containers to a predetermined position.

8. Equipment according to claim 7, further comprising:
   control means for raising said additional barrier to allow a leading said container to move forward once one of the cooking chambers becomes empty.

9. Equipment according to claim 3, further comprising:
   charging mechanism;
   discharging mechanism; and
   said charging and discharging mechanism being operated in accordance with the information received from said information store means.

10. Equipment according to claim 1, wherein the working medium of the cooking chambers is high-pressure steam.

11. Equipment according to claim 1, wherein each said chamber includes electrical heating means.